United States Patent [19]
Lindström

[11] Patent Number: 5,028,498
[45] Date of Patent: Jul. 2, 1991

[54] FUEL CELL ANODE

[76] Inventor: Olle B. Lindström, Per Sundbergs v 26, S-183 63 Täby, Sweden

[21] Appl. No.: 438,451

[22] PCT Filed: Apr. 6, 1989

[86] PCT No.: PCT/SE89/00183
§ 371 Date: Jan. 26, 1990
§ 102(e) Date: Jan. 26, 1990

[87] PCT Pub. No.: WO89/10009
PCT Pub. Date: Oct. 19, 1989

[51] Int. Cl.[5] .................................. H01M 4/92
[52] U.S. Cl. ........................................ 429/40
[58] Field of Search ............................ 429/40

[56] References Cited
U.S. PATENT DOCUMENTS

| | | | |
|---|---|---|---|
| 3,428,544 | 2/1969 | Bianchi et al. | 429/40 |
| 3,444,003 | 5/1969 | Moser | 429/40 |
| 3,650,838 | 3/1972 | Giner et al. | 429/40 |
| 4,828,941 | 5/1989 | Sterzel | 429/40 |

Primary Examiner—Donald L. Walton

[57] ABSTRACT

The invention refers to a fuel cell electrode for oxidation of preferably methanol in a fuel cell with acid electrolyte. The electrocatalytically active material comprises known noble metal catalysts such as mixtures of platinum and ruthenium which have been fortified with lead or lead compounds added in this connection in a large quantity so that the addition of lead or lead compounds is above a concentration around 5 mg $Pb/cm^2$. A suitable amount is 5–10 mg $Pb/cm^2$. Fuel cell electrodes of this kind can also be used for other fuels for instance hydrogen containing carbon monixide in acid electrolytes up to around 250° C.

2 Claims, 1 Drawing Sheet

Figure 1. Voltage-current curves vs reference electrode at 60 °C in 4-M $H_2SO_4$ and 1-M MeOH. The base formulation is 0.7 mg Pt + 0.7 mg Ru per $cm^2$. Experimental data refer to following conditions: A added lead 0 mg $Pb/cm^2$, B 0.7 mg $Pb/cm^2$ after 1 week, C as B but 3 weeks, D 1.0 mg $Pb/cm^2$ after 3 weeks, E as D but 1.5 mg $Pb/cm^2$, F as D but 5.0 mg $Pb/cm^2$ and G as D but 10.0 mg $Pb/cm^2$.

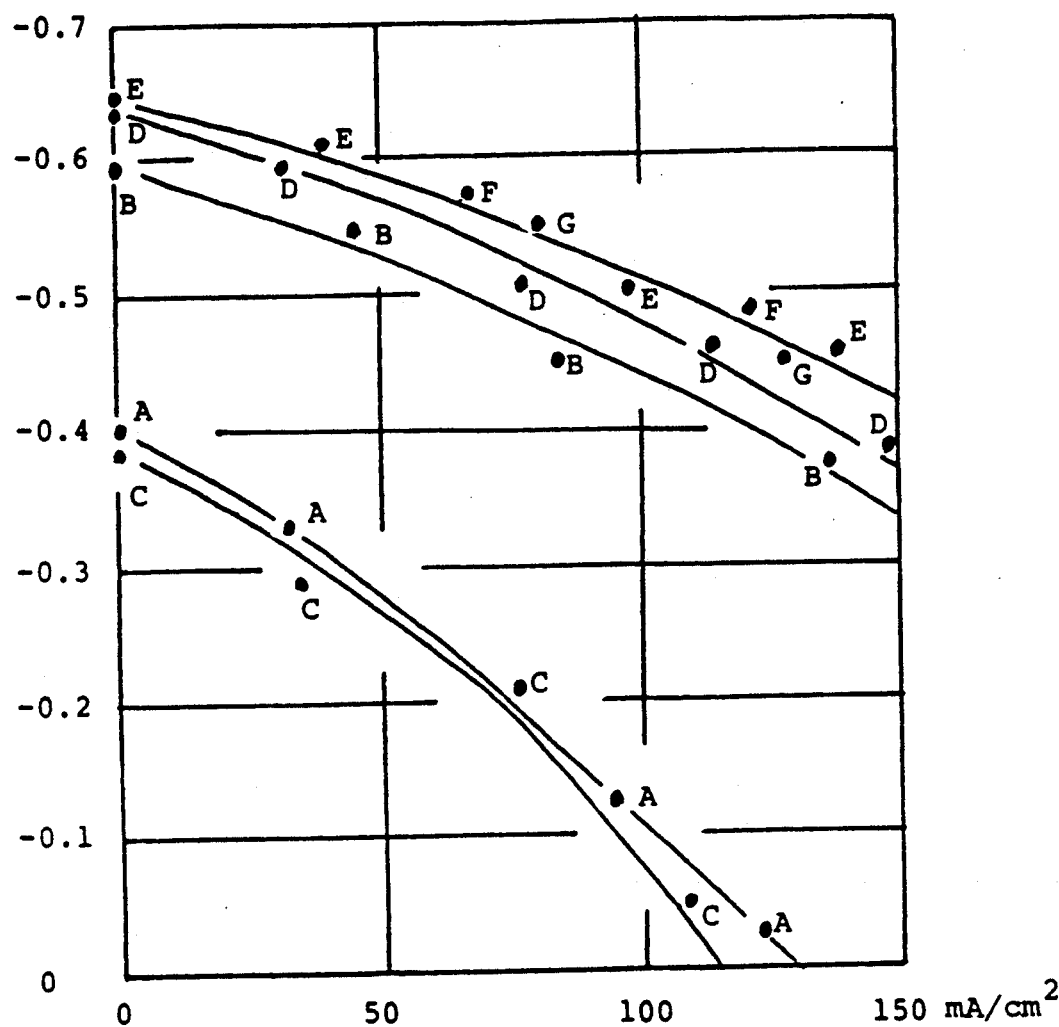
Figure 1. Voltage-current curves vs reference electrode at 60 °C in 4-M $H_2SO_4$ and 1-M MeOH. The base formulation is 0.7 mg Pt + 0.7 mg Ru per $cm^2$. Experimental data refer to following conditions: A added lead 0 mg $Pb/cm^2$, B 0.7 mg $Pb/cm^2$ after 1 week, C as B but 3 weeks, D 1.0 mg $Pb/cm^2$ after 3 weeks, E as D but 1.5 mg $Pb/cm^2$, F as D but 5.0 mg $Pb/cm^2$ and G as D but 10.0 mg $Pb/cm^2$.

FUEL CELL ANODE

A fuel cell which directly converts the chemical energy in a liquid fuel to electricity in the cold combustion process taking place in a fuel cell has for a long time been considered the final goal for the fuel cell researchers. Several very large development projects have been concerned with this task. Methanol has been the fuel of choice but other fuels like diesel oil or organic compounds with high energy density like ethylene diglycol have also been tested. These efforts have not been entirely unsuccessful. By means of heavy load of noble metal catalysts corresponding to about 300 mg platina/W it has been possible to demonstrate a performance corresponding to the level 20–30 mW/cm$^2$ electrode area. This performance level is satisfactory in special applications like cordless chargers. Such generators, however, become very expensive because of the noble metal content.

This kind of fuel cells uses PTFE bonded carbon electrodes with the active catalytic material disposed on the carbon support. The air electrode is a conventional gas diffusion electrode with 0.5–1 mg platinum/cm$^2$ The methanol electrode is using PTFE only as a binder not as a hydrophobic agent. The catalytic material is frequently a 50/50 mixture of platinum and ruthenium. It has also been found that small additions of lead, tin and bismuth as an alloy component or as so called adatoms improves the catalytic action somewhat. The electrolyte is typically 4-M sulphuric acid and the operating temperature 50°–60° C. Methanol is added to the electrolyte from a tank by means of a pump. Carbon dioxide which is formed in the cold corbustion process evaporates from the acid electrolyte.

The air electrode is frequently sensitive to the presence of methanol and may be protected by means of an ion exchange membrane. Fuel cells of this kind are described in U.S. Pat. No. 4,262,063. The state of art is described in B.D. McNicol and D.A.J. Rand: "Power Sources for Electric Vehicles", Elsevier, Amsterdam 1984, p. 807-836. The reason for the high quantities of noble metal required in state of art methanol electrodes is considered to be poisoning by intermediates or by-products of the electrode reaction. A methanol electrode shows initially a very high activity. This high initial activity is lost already within 50 milliseconds. Several studies have been carried out to clarify the poisoning effect but the results are not entirely conclusive. Many researchers, however, maintain that the poisoning can be attributed to absorption of carbon monoxide which also is in harmony with experiences from other types of fuel cells with acid electrolyte and noble metal catalyst.

The present invention is the result of an unconditional evaluation of fairly large quantities of different chemical compounds which have been chosen by intuition with no regard to any views regarding reaction mechanism. This search has been successful and resulted in a methanol electrode with very much better performance and therefore very much lower material costs than the methanol electrodes which have been briefly described above. In this way the most important obstacle for the use of the direct methanol air cell in practice has been eliminated. It has also been shown that the new electrode is useful also with other fuel cells and fuel cell types which utilize acid electrolytes in a temperature region up to about 250° C.

The invention is characterized in that it refers to a fuel cell anode with noble metal catalyst for fuel cells with acid electrolyte characterized in that the anode contains a separate addition of lead or lead compounds in a concentration above about 5 mg Pb/cm$^2$.

The voltage current curve for a methanol electrode with lead addition is improved with more than 200 mV compared to a corresponding electrode without lead addition. No explanation to this can be offered at the present stage. As mentioned above lead in the form of adatom or alloying component has a certain positive effect on the performance of the methanol electrode but this effect is small compared to the effect of the lead additive according to the invention. Of course the lead additive according to the invention can be combined with the methanol electrodes with a noble metal alloy containing platinum-ruthenium with tin, lead or bismuth additive according to the present state of art.

Alloying with lead or coating with lead adatoms modifies the properties of the noble metal surface in a favourable way for the oxidation of the methanol. Such a mechanism could not be the explanation to the dramatic improvement which is obtained with the separate large lead additions to the electrode structure according to the present invention. There must be some kind of symbios between the noble metal catalyst and the large addition of lead since lead alone has no catalytic action.

There is a possibility that the lead addition takes care of or contributes to the current transport. It is also possible that the noble metal catalyst supports, in one way or another way, a reduction of $Pb^{2+}$ to $Pb°$ during simultaneous oxidation of methanol and/or intermediate products occurring at the direct electrochemical oxidation of methanol. To clarify the mechanism for the technical action of the invention is a very interesting research topic.

The invention will now be described in detail by means of some examples. Efficient noble metal catalyst for methanol electrodes can be produced by means of so called microemulsion technique. A typical such electrode according to the present state of art is manufactured in the following way: 516 g normal-hexan and 60 g of a surface active agent, Berol 50, were mixed well in a Braun-mixer. Thereafter two portions of distilled water of 12 ml were added during agitation at a high velocity. 12,5 ml dinitrodiamine platinum (II)-salt solution and 9.5 ruthenium nitrosylnitrate salt solution were added with vigorous agitation. The pH has adjusted to pH 5-6 with Na-oktylate. The noble metal was out-reduced by means of hydrazin hydroxide. 10 g Shawnigan carbon was added after 15 minutes, the mixture was stirred during 2 minutes. The carbon was precipitated after 10 minutes with 10 ml tetrahydrofuran. After wash and drying 5 % polytetrafluorethylene was added as a dispersion. After drying at 40° C. and sintering at 320° C. during 30 minutes 1.5 g PbO was mixed into the mass which was rolled on a carbon paper.

The lead addition can be incorporated in such an electrode in different ways. One may use the technique which is developed for the manufacture of commercial lead acid batteries. After all one may visualize the fuel cell anode according to the invention as a physical mixture of a conventional fuel cell anode and the electrode material for a conventional negative lead electrode. A simple method is just to mix in lead oxide powder of battery quality as in this example. However, one may also use other lead compounds like PbSO$_4$, PbS, metallic lead powder etc. After a short time in the cell environment these lead compounds show the same activity as the lead oxide in the present example.

FIG. 1 shows a voltage current curve for different methanol electrodes against a reference electrode in 4-M sulphuric acid with an addition of 1-M methanol. The electrode with 0.7 mg Pb/cm$^2$ gives a good initial activity but is loosing the activity after 1 week. 1 mg Pb/cm$^2$ gives a lasting action as higher quantities do.

The key to the technical effect of the invention is thus the comparatively large quantity of added lead compound. Here a level around 1 mg Pb/cm$^2$ has been indicated with reference to FIG. 1 as the region where the technical effect of the invention is fully developed. A technical effect comparable to the effect of adatoms is apparently also observed somewhat below this level. This effect, however, is lost after comparatively short time and is therefore of no value for practical application. The reduction can to some extent be caused by the fact that PbSO$_4$ has a certain solubility in the electrolyte at this temperature. This solubility does not, however, influence effects of adatoms or lead present in the alloy form.

Lead is a cheap material and it is therefore possible to work in the practice with comparatively large quantities at the level of 5-10 mg Pb/cm$^2$ or above. For comparison it can be mentioned that the lead quantities used as adatoms or alloy components can be calculated to concentrations on the level 0.1-0.3 mg Pb/cm$^2$.

Most of these experiments have been carried out with fuel cell anodes for methanol as described above. It has, however, been found that a similar technical effect is also obtained with other systems for instance fuel cell anodes for hydrogen in cells with phosphoric acid as electrolyte or fuel cell anodes for reformed natural gas with carbon monoxide in acid electrolyte.

I claim:

1. Fuel cell anode with a catalyst of a mixture of platinum and ruthenium for fuel cells with acid electrolyte characterized in that the anode contains a separate additive of lead or lead compounds in a concentration above about 5 mg Pb/cm$^2$ in a physical mixture with the other electrode components.

2. Fuel cell anode according to claim 1 characterized in that the additive of lead or lead compounds is in the region of about 5-10 mg Pb/cm$^2$.

* * * * *